United States Patent
Tseng et al.

(10) Patent No.: US 11,977,715 B2
(45) Date of Patent: May 7, 2024

(54) VEHICLE DISPLAY

(71) Applicant: Ford Global Technologies, LLC, Dearborn, MI (US)

(72) Inventors: Fling Finn Tseng, Ann Arbor, MI (US); Johannes Geir Kristinsson, Ann Arbor, MI (US); Daryl Martin, Kitchener (CA); Bhagyashri Satyabodha Katti, Novi, MI (US); Himanshu Verma, Farmington Hills, MI (US); Shiqi Qiu, Canton, MI (US); Jonathan Niemi, Waterloo (CA); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 453 days.

(21) Appl. No.: 17/171,273

(22) Filed: Feb. 9, 2021

(65) Prior Publication Data

US 2022/0261136 A1    Aug. 18, 2022

(51) Int. Cl.
*G06F 3/04842* (2022.01)
*B60K 35/00* (2006.01)
(Continued)

(52) U.S. Cl.
CPC .......... *G06F 3/04817* (2013.01); *B60K 35/00* (2013.01); *G06F 3/04842* (2013.01);
(Continued)

(58) Field of Classification Search
CPC . G06F 3/04817; G06F 3/04842; B60K 35/00; B60K 2370/186; B60K 2370/736;
(Continued)

(56) References Cited

U.S. PATENT DOCUMENTS 8,494,984 B2    7/2013   Ito et al.
10,065,502 B2 *  9/2018   Miller ................... B60K 35/00
(Continued)

FOREIGN PATENT DOCUMENTS

DE       102018205953 A1    10/2019
GB          2592217 A  *  8/2021  ............. G05B 13/02

OTHER PUBLICATIONS

Shokoufeh Monjezi Kouchak et al., "Using Artificial Intelligence to Automatically Customize Modern Car Infotainment Systems", Conference Paper Feb. 2018; https://www.researchgate.net/publication/323376687.

*Primary Examiner* — Antonio A Caschera
(74) *Attorney, Agent, or Firm* — Brandon Hicks; Bejin Bieneman PLC

(57) ABSTRACT

An identifier for first set of display content on a vehicle display is input to a statistical model that outputs a plurality of probabilities that a user input will select each of a plurality of second set of display contents for display after the first set of display content is displayed. A first probability is identified for a predicted set of display content that is a highest probability in the plurality of probabilities. The plurality of probabilities are provided to at least one of an optimization model and a neural network upon determining an accuracy of the statistical model is below a threshold. Upon receiving, from the at least one of the optimization model and the neural network, a second probability for the predicted set of display content, the display content is selected based on the first and second probabilities. The vehicle display is updated based on the selected set of display content.

20 Claims, 7 Drawing Sheets

(51) Int. Cl.
  *G06F 3/04817* (2022.01)
  *B60K 35/10* (2024.01)
  *B60K 35/29* (2024.01)
  *B60K 35/65* (2024.01)

(52) U.S. Cl.
  CPC .............. *B60K 35/10* (2024.01); *B60K 35/29* (2024.01); *B60K 35/654* (2024.01); *B60K 2370/119* (2019.05); *B60K 2370/186* (2019.05)

(58) Field of Classification Search
  CPC .... B60K 2370/119; G06N 3/02; G06N 3/047; G06N 7/01; G06N 7/046
  See application file for complete search history.

(56) References Cited

U.S. PATENT DOCUMENTS

| | | | |
|---|---|---|---|
| 2017/0282930 A1 | 10/2017 | Kochhar et al. | |
| 2018/0217717 A1* | 8/2018 | Yasuda | G06F 3/0488 |
| 2021/0072866 A1* | 3/2021 | Srail | B60K 37/06 |

\* cited by examiner

VEHICLE DISPLAY

BACKGROUND

A vehicle can include a human-machine interface (HMI), e.g., a touchscreen display, that can provide display content to a user. The HMI can include sensors that can detect user inputs, e.g., a user touching a virtual button on the HMI. The HMI can, for example, maintain display content until the HMI detects a user input selecting an updated display content. The HMI can then display the updated display content based on the user input.

DETAILED DESCRIPTION

Figure 1:
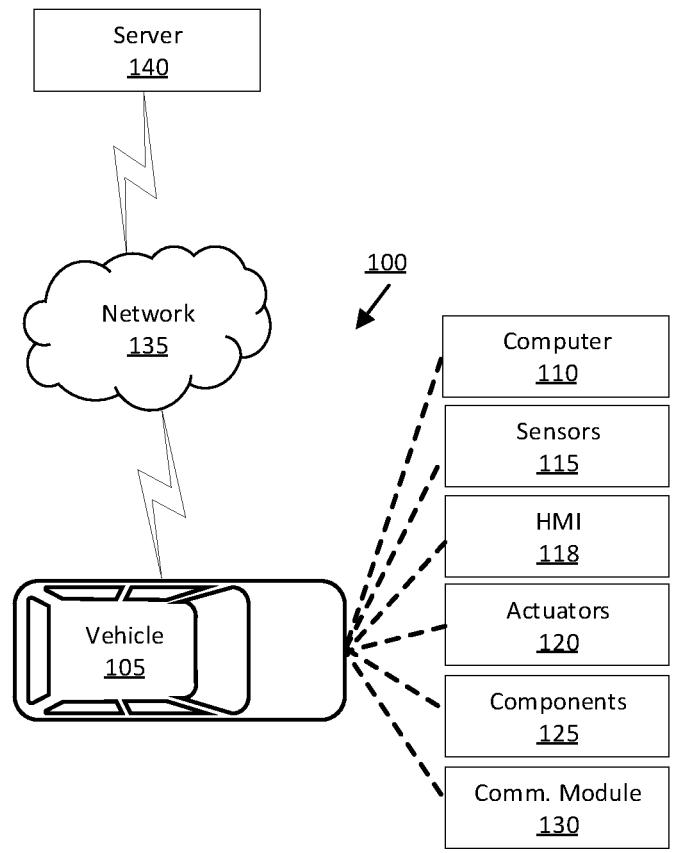
FIG. 1 is a block diagram illustrating an example vehicle control system for a vehicle.

A system includes a computer including a processor and a memory, the memory storing instructions executable by the processor to determine an identifier for first set of display content on a vehicle display. The instructions further include instructions to input the identifier to a statistical model that outputs a plurality of probabilities that a user input will select each of a plurality of second set of display contents for display after the first set of display content is displayed. The instructions further include instructions to identify a first probability for a predicted set of display content in the plurality of second set of display contents that is a highest probability in the plurality of probabilities. The instructions further include instructions to provide the plurality of probabilities to at least one of an optimization model and a neural network upon determining an accuracy of the statistical model is below a threshold. The accuracy is determined based on a number of selections of respective second set of display contents assigned a probability in the plurality of probabilities compared to a number of predictions of the respective second set of display contents assigned a probability in the plurality of probabilities. The instructions further include instructions to, upon receiving, from the at least one of the optimization model and the neural network, a second probability that the user input will select the predicted set of display content in the plurality of second set of display contents, select the predicted set of display content based on the first probability and the second probability. The instructions further include instructions to update the vehicle display based on the selected set of display content.

The system can include a remote computer including a second processor and a second memory storing instructions executable by the second processor to input the plurality of probabilities to the neural network that outputs the second probability.

The instructions can further include instructions to, upon generating a prediction image that corresponds to the plurality of probabilities, input the prediction image to the neural network. Pixels of the prediction image can have indicia that represent each of the plurality of probabilities.

The system can include a remote computer including a second processor and a second memory storing instructions executable by the second processor to input the plurality of probabilities to the optimization model that outputs a plurality of updated probabilities. The optimization model can update the plurality of probabilities based on aggregated data. The instructions can further include instructions to update the first probability for the predicted set of display content in the plurality of second set of display contents to be a highest updated probability in the plurality of updated probabilities.

The instructions can further include instructions to input the plurality of updated probabilities to the neural network that outputs the second probability that the user input will select the predicted set of display content in the plurality of second set of display contents.

The instructions can further include instructions to, upon generating a prediction image that corresponds to the plurality of probabilities, input the prediction image to the neural network. Pixels of the prediction image can have indicia that represent each of the plurality of probabilities.

The instructions can further include instructions to, upon receiving the second probability that the user input will select the selected set of display content in the plurality of second set of display contents, select the predicted set of display content based on the updated first probability and the second probability.

The instructions can further include instructions to input the plurality of probabilities to the optimization model based on a number of user inputs selecting each of the plurality of second set of display contents after the first set of display content is displayed being above a threshold.

The statistical model can determine the plurality of probabilities based on a number of respective user inputs selecting the respective second set of display content after the first set of display content is displayed compared to a number of user inputs selecting second set of display contents after the first set of display content is displayed.

The statistical model can determine the plurality of probabilities based additionally on an amount of time the first set of display content is displayed.

The instructions can further include instructions to, upon determining the accuracy of the statistical model is greater than or equal to the threshold, select the predicted set of display content based on the first probability.

The instructions can further include instructions to disable a second set of display content that is associated with a lowest probability for a predicted set of display content in the plurality of second set of display contents.

The instructions can further include instructions to update positions of virtual buttons on the vehicle display based on the selected set of display content. The virtual buttons can represent respective second set of display contents.

The statistical model can output a plurality of probabilities that a user input will select each of a plurality of second set of display contents after the first set of display content is displayed based on at least one of environment conditions and a number of occupants in a vehicle.

The instructions can further include instructions to determine a preferred display content based on the statistical model. The instructions can further include instructions to, upon detecting the vehicle display transitioning to an ON state, display the preferred display content.

A method includes determining an identifier for first set of display content on a vehicle display. The method further includes inputting the identifier to a statistical model that outputs a plurality of probabilities that a user input will select each of a plurality of second set of display contents for display after the first set of display content is displayed. The method further includes identifying a first probability for a predicted set of display content in the plurality of second set of display contents that is a highest probability in the plurality of probabilities. The method further includes providing the plurality of probabilities to at least one of an optimization model and a neural network upon determining an accuracy of the statistical model is below a threshold. The accuracy is determined based on a number of selections of respective second set of display contents assigned a probability in the plurality of probabilities compared to a number of predictions of the respective second set of display contents assigned a probability in the plurality of probabilities. The method further includes, upon receiving, from the at least one of the optimization model and the neural network, a second probability that the user input will select the predicted set of display content in the plurality of second set of display contents, selecting the predicted set of display content based on the first probability and the second probability. The method further includes updating the vehicle display based on the selected set of display content.

The method can further include, based on a number of user inputs selecting each of the plurality of second set of display contents after the first set of display content is displayed being above a threshold, inputting the plurality of probabilities to the optimization model that outputs a plurality of updated probabilities. The optimization model can update the plurality of probabilities based on aggregated data. The method can further include updating the first probability for the predicted set of display content in the plurality of second set of display contents to be a highest updated probability in the plurality of updated probabilities.

The method can further include inputting the plurality of updated probabilities to the neural network that outputs the second probability that the user input will select the predicted set of display content in the plurality of second set of display contents.

The method can further include, upon receiving the second probability that the user input will select the selected set of display content in the plurality of second set of display contents, selecting the predicted set of display content based on the updated first probability and the second probability.

The method can further include, upon determining the accuracy of the statistical model is greater than or equal to the threshold, selecting the predicted set of display content based on the first probability.

Further disclosed herein is a computing device programmed to execute any of the above method steps. Yet further disclosed herein is a computer program product, including a computer readable medium storing instructions executable by a computer processor, to execute an of the above method steps.

While a first set of display content is being displayed on a vehicle display, a vehicle computer can select a second set of display content based on one or more probabilities that the second set of display content will be selected by a user input. The one or more probabilities are output from a statistical model and/or at least one of an optimization model and a neural network, as discussed herein. The vehicle computer can then update a vehicle display based on the selected second display content.

A vehicle typically includes a human-machine interface (HMI), such as a knobs, buttons, touchscreen displays, etc., that can receive user inputs and/or provide outputs to a user. For example, while a first set of display content is displayed, the HMI can receive a user input selecting one of a plurality of second display contents or selecting actuation of one or more vehicle components. The HMI typically a plurality of virtual buttons that represents each of the plurality of sets of display content and/or the vehicle components. However, the HMI may lack computational resources to activate all of the display contents prior receiving to a user input, which can result in the display content being unavailable when a user desires to select the display content.

Advantageously, a vehicle computer can determine an identifier of a first set of display content and input the identifier to a statistical model that outputs a plurality of probabilities that a user input will select each of the plurality of second display contents after the first set of display content is displayed. The vehicle computer can determine a first probability is a highest probability of the plurality of probabilities. Additionally, the vehicle computer can provide the plurality of probabilities to at least one of an optimization model and a neural network based on an accuracy of the statistical model being below a threshold. The vehicle can receive a second probability for the predicted display content from the at least one of the optimization model and the neural network. The vehicle computer can select a second set of display content based on the first and second probabilities. The vehicle computer can then update the HMI based on the selected display content. Updating the HMI based on the selected display content allows the vehicle computer to control activation of each of the second set of display contents according to probabilities that a user input will select each of the second set of display contents, which allows the vehicle computer to prioritize computational resources to activate second display contents that are more likely to be selected by a user input.

Figure 2A:
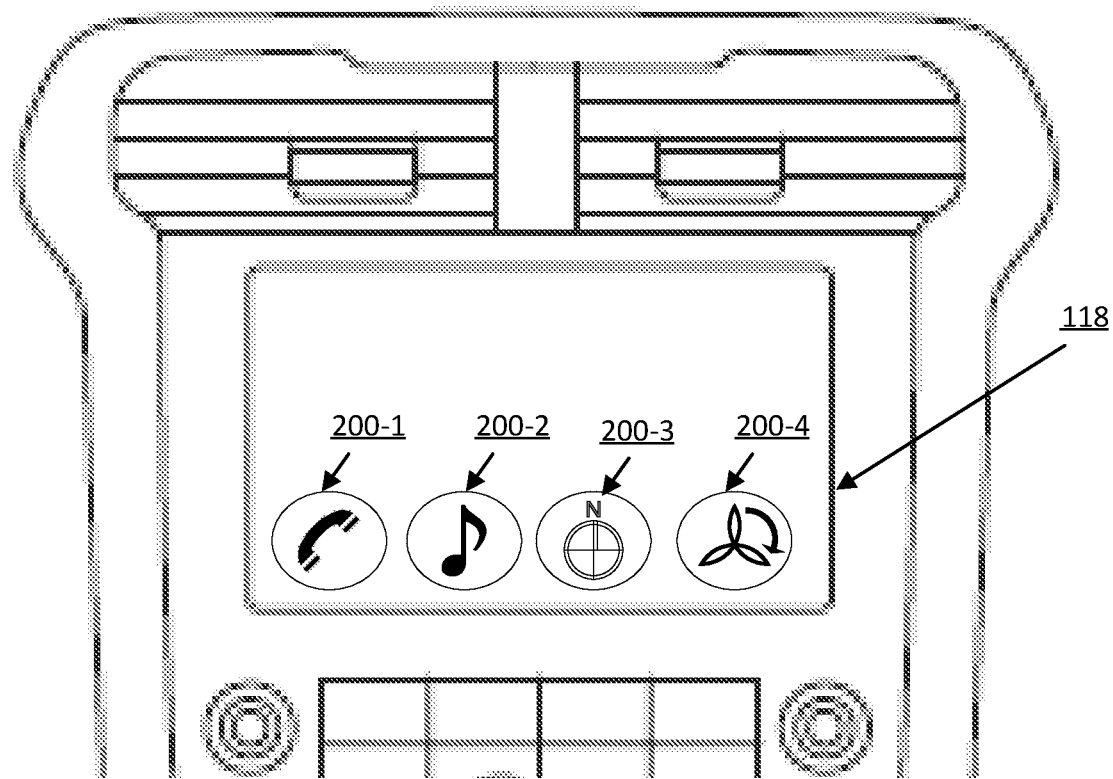
FIG. 2A is a diagram of an example vehicle display including a plurality of virtual buttons representing each of a plurality of second display contents.
Figure 2B:
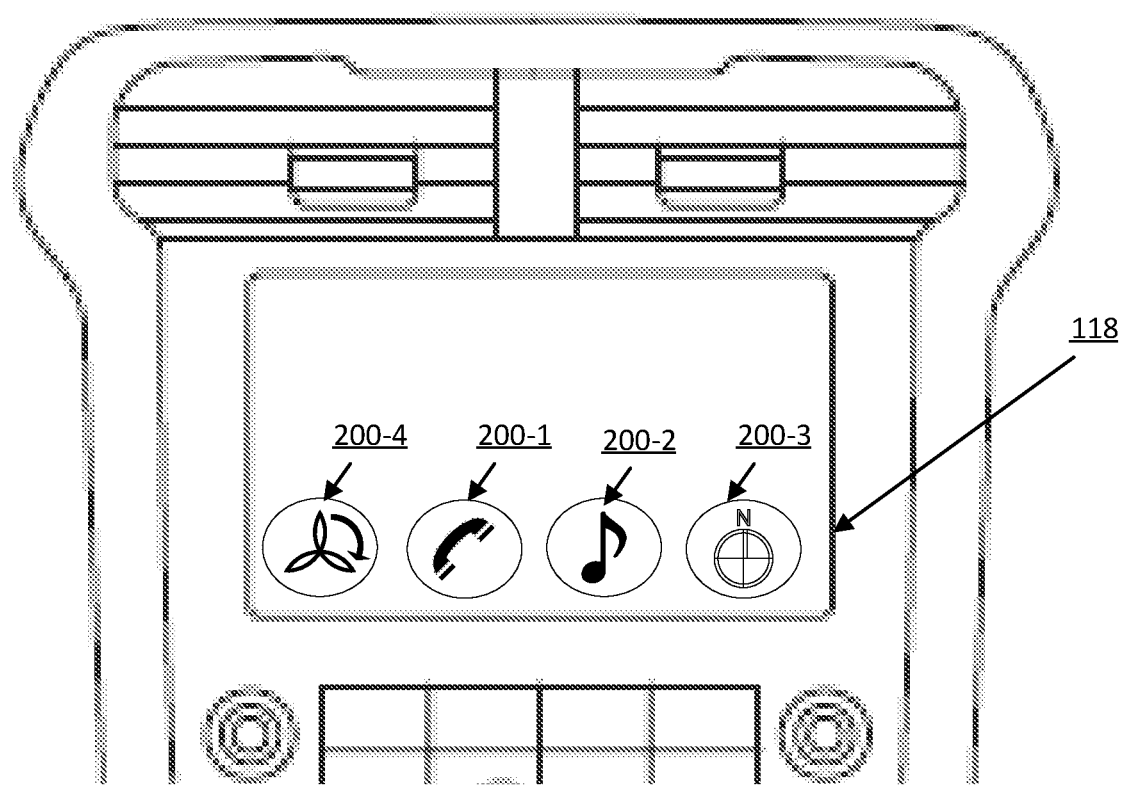
FIGS. 2B-2C are diagrams of example updates to the virtual buttons on the vehicle display.
Figure 2C:
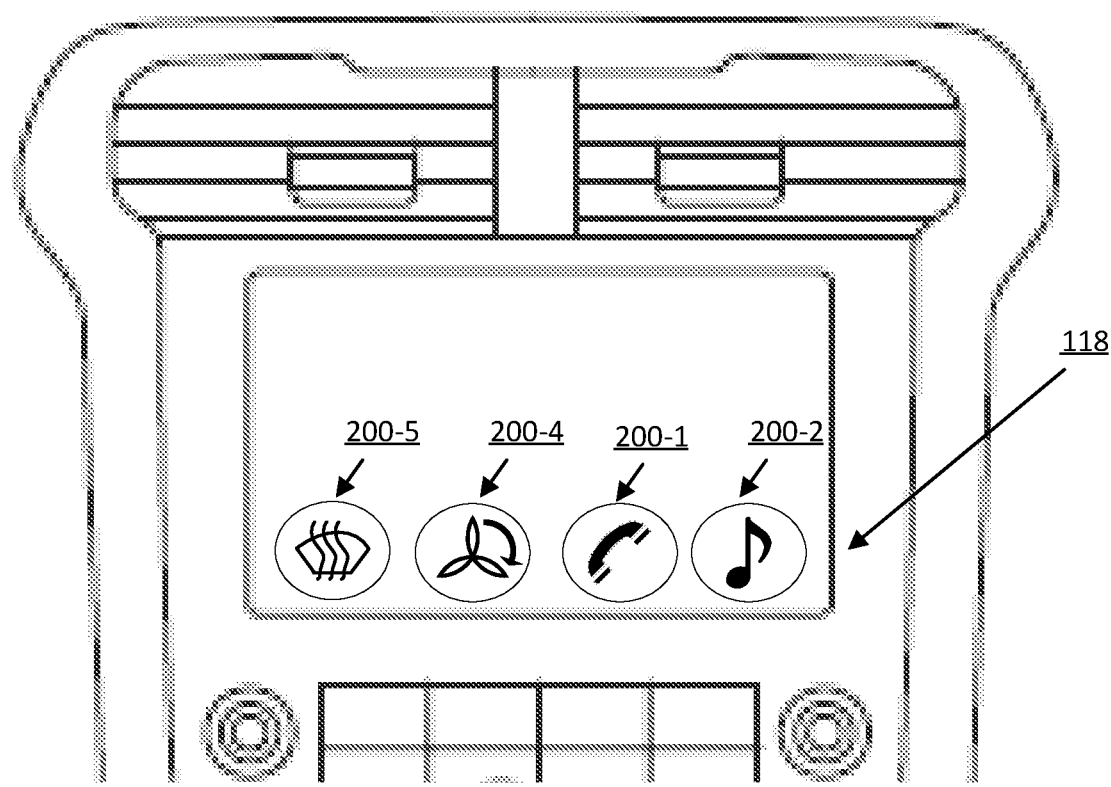

With reference to FIGS. 1-2C, an example vehicle control system 100 includes a vehicle 105. A vehicle computer 110 in the vehicle 105 receives data from sensors 115. The vehicle computer 110 is programmed to determine an identifier for first display content on a vehicle display 118. The vehicle computer 110 is further programmed to input the identifier to a statistical model that outputs a plurality of probabilities that a user input will select each of a plurality of second display contents for display after the first set of display content is displayed. The vehicle computer 110 is further programmed to identify a first probability for a predicted display content in the plurality of second display contents that is a highest probability in the plurality of probabilities. The vehicle computer 110 is further programmed to provide the plurality of probabilities to at least one of an optimization model and a neural network upon determining that an accuracy of the statistical model is below a threshold. The accuracy is determined based on a number of selections of respective second display contents assigned a probability in the plurality of probabilities compared to a number of predictions of the respective second display contents assigned a probability in the plurality of probabilities. The vehicle computer 110 is further programmed to, upon receiving, from the at least one of the optimization model and the neural network, a second probability that the user input will select the predicted display content in the plurality of second display contents, select the predicted display content based on the first probability and the second probability. The vehicle computer 110 is further programmed to update the vehicle display 118 based on the selected display content.

Turning now to FIG. 1, the vehicle 105 typically includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, and/or other protocols that can support vehicle-to-vehicle, vehicle-to infrastructure, vehicle-to-cloud communications, or the like, and/or via a packet network 135.

The vehicle computer 110 typically includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other vehicles and other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes mechanisms for user input and/or output including one or more user input components or devices such as knobs, buttons, switches, pedals, levers, touchscreens, and/or microphones, etc. The input devices or components may include sensors 115 to detect user inputs and provide user input data to the vehicle computer 110. That is, the vehicle computer 110 may be programmed to receive user input from the HMI 118. The user may provide each user input via the HMI 118, e.g., by touching a virtual button on a touchscreen display, by providing voice commands, etc. For example, a touchscreen display included in an HMI 118 may include sensors 115 to detect that a user touched a virtual button on the touchscreen display to, e.g., select or deselect a vehicle operation mode, such as an eco-mode, a sport mode, a draft mode, etc., which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The vehicle computer 110 can be programmed to obtain data about environmental conditions around the vehicle 105, i.e., data providing measurements of phenomena outside a vehicle, i.e., in an environment around the vehicle, that is collected about operation of one or more vehicle 105 subsystems and/or components 125; vehicle environment conditions can include location data, road data, weather data (e.g., ambient temperature, ambient light) and a time of day.

The vehicle computer 110 may, for example, identify a current road of vehicle 105 operation based on map data. A road in the present context is an area of ground surface that includes any surface provided for land vehicle travel. A road is defined with boundaries, e.g., by geo-fencing. The vehicle computer 110 may receive the map data from the remote server computer 140, e.g., via the network 135. In such an example, a geo-fence specifies a perimeter of the road according to geo-coordinates, e.g., such as are used in the Global Positioning System (GPS) that specify lines defining boundaries, i.e., the perimeter, of the road. The vehicle computer 110 can then determine the vehicle 105 is on the road based on the location data of the vehicle 105 indicating the vehicle 105 is within a geo-fence.

Upon identifying a current road of vehicle 105 operation, the vehicle computer 110 may determine one or more characteristics of the current road, i.e., physical quantities that describe measurements and/or limitations of the road. For example, road characteristics can include a curvature, an inclination, a speed limit, number of lanes, etc. The vehicle computer 110 can, for example, determine the road characteristics based on the map data. The vehicle computer 110 can then determine a type of the current road based on the characteristics of the current road. A type of road is a classification of the road that describes expected vehicle use of the road. Each type of road is further defined by a plurality of predefined characteristics. A road type can be identified by an identifier that describes the road type. Non-limiting examples of types of roads include: highways, freeways, expressways, service drives, side streets, off-ramps, on-ramps. The plurality of predefined characteristics for each type of road may be specified, e.g., by government regulations.

The vehicle computer 110 may determine weather data for the vehicle 105 location based on sensor 115 data. For example, the vehicle computer 110 can analyze image data, e.g., using image processing techniques, to determine the weather data for the vehicle 105 location, e.g., a presence or absence and/or type of precipitation, e.g., rain, snow, fog, etc. As another example, the vehicle computer 110 can receive data from e.g., a precipitation sensor 115, an ambient temperature sensor 115, a humidity sensor 115, etc., indicating weather data for the vehicle 105 location. A precipitation sensor 115 can be any sensor suitable to detect precipitation. For example, the precipitation sensor 115 may include an LED bulb, a light sensor, and possibly a prism reflecting light from the LED bulb to the light sensor; the presence of water scatters some of the light, reducing the light received by the light sensor by a known amount. As yet another example, the vehicle computer 110 can receive weather data from an external server, e.g., from a weather station, the remote server computer 140, etc. The weather data typically includes conventional measurements, e.g., ambient air temperature, ambient humidity, precipitation data, forecasts, wind speed, etc. That is, the weather data may specify a wind speed and a wind direction in addition to other physical phenomenon in an ambient environment, e.g., an air temperature, an amount of ambient light, a presence or absence of precipitation, a type of precipitation (e.g., snow, rain, etc.), an amount of precipitation (e.g., a volume or depth of precipitation being received per unit of time, e.g., amount of rain per minute or hour), presence or absence of atmospheric occlusions that can affect visibility, e.g., fog, smoke, dust, smog, a level of visibility (e.g., on a scale of 0 to 1, 0 being no visibility and 1 being unoccluded visibility), etc.

The vehicle computer 110 can determine a number of occupants in the vehicle 105 based on sensor 115 data. For example, the vehicle computer 110 can receive sensor 115 data from a plurality of seat occupancy sensors 115 indicating an absence or presence of an occupant in each of a plurality of seats in the vehicle 105. As another example, the vehicle computer 110 can receive sensor 115 data, e.g., image data, of a passenger cabin of the vehicle 105. The image data can include one or more occupants in the passenger cabin, e.g., seated in respective seats. For example, object classification or identification techniques, can be used, e.g., in the vehicle computer 110 based on lidar sensor 115, camera sensor 115, etc., data to identify a type of object, e.g., a vehicle, a bicycle, a drone, a pedestrian, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more occupants or an indication that no occupant is present in the respective region of interest. Further, a coordinate system (e.g., polar or cartesian) applied to an area within the vehicle 105 can be used to specify locations and/or areas (e.g., according to the vehicle 105 coordinate system, translated to global latitude and longitude geo-coordinates, etc.) of occupants identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 can manage startup and shutdown of the vehicle 105. For example, the vehicle computer 110 can startup or shutdown the vehicle 105 based on receiving a request from, e.g., the remote server computer 140, user input to a power or start/stop button or the like in a passenger cabin of the vehicle 105, a key turning an ignition, etc. That is, the vehicle computer 110 can transition the vehicle 105 between activation states. In this context, an "activation state" specifies a power state of vehicle components 125, i.e., whether, and/or an amount that, a component 125 is electrically powered during startup and/or shutdown of the vehicle 105, e.g., unpowered, powered with a specific power supply, etc. The activation state can be one of an off state and an on state. In the on state, all vehicle components 125 are available to be actuated by the vehicle computer 110 to operate the vehicle 105. In the off state, the vehicle computer 110 and components 125 are substantially powered off to conserve energy when the vehicle 105 is not in use.

A power supply provides electricity to one or more components 125. The power supply can include one or more batteries, e.g., 12-volt lithium-ion batteries, and one or more power networks to supply power from the batteries to the components 125. In the on state, the power supply provides power to all of the vehicle components 125. In the off state, the power supply does not provide power to the vehicle components 125. The vehicle computer 110 can receive power from the power supply regardless of the activation state. The vehicle computer 110 can actuate the power supply based on the activation state.

When the vehicle 105 transitions to the ON state, the vehicle computer 110 can actuate the HMI 118 to display a first, i.e., current, set of display content. In this context, a set of display content is a representation of a vehicle system, e.g., a navigation system, an audio system, a climate control system, etc., or a user device that is in communication with the vehicle computer 110, e.g., via the network 135. A set of display content can include one or more content items, i.e., one or more representations of an item to accept a user input or provide a user output. For example, a representation of a control on a touchscreen, such as a knob, slider, button, etc., is a content item that can be included in a set of display content. A user device can be a conventional computing device, i.e., including one or more processors and one or more memories, programmed to provide operations such as disclosed herein. The user device can be a portable device. A portable device can be any one of a variety of computers that can be used while carried by a person, e.g., a smartphone, a tablet, a personal digital assistant, a smart watch, etc.

Additionally, when the vehicle 105 is in the ON state, the vehicle computer 110 enables user selection of each of a plurality of second, i.e., subsequent, sets of display content. The display content not displayed as the first set of display content may be selected as a second set of display content by a user input. For example, the vehicle computer 110 may actuate the HMI 118 to detect a user input selecting a second set of display content. For example, the HMI 118 may be programmed to display a plurality of virtual controls such as buttons on a touchscreen display that the user can touch or press to select each of the plurality of second display contents. In other words, the HMI 118 may activate sensors 115 that can detect the user touching a virtual button to select a corresponding second display content. Upon detecting the user input, the HMI 118 can display the second set of display content and can then provide the user input to the vehicle computer 110, e.g., via the vehicle communication network.

The HMI 118 can maintain a plurality of sets of display content. The HMI 118 can display any one of the plurality of sets of display content as the first set of display content after transitioning the vehicle 105 to the ON state. As one example, the first set of display content can be a last display content that was displayed when the vehicle 105 was previously in the ON state. That is, after the vehicle 105 transitions from the OFF state, the HMI 118 can display the same display content that was displayed when the vehicle 105 transitioned to the OFF state. As another example, the first set of display content can be a preferred display content, as discussed below. At a time after the vehicle 105 transitions to the ON state, the first set of display content refers to a set of display content that is currently displayed, and the second set of display content refers to a set of display content that can be subsequently displayed after the display content that is currently displayed.

Each of the plurality of sets of display content can include one or more selectable virtual buttons, or the like. For example, the HMI 118 may be programmed to display a plurality of virtual buttons on a touchscreen display that the user can touch to actuate each of a plurality of vehicle components 125 associated with the display content. In other words, the HMI 118 may activate sensors 115 that can detect the user touching a virtual button to actuate a vehicle component 125. Upon detecting that one of the virtual buttons is selected, as discussed below, the HMI 118 can provide the user input to the vehicle computer 110, and the vehicle computer 110 can actuate one or more vehicle components 125 based on the user input, e.g., to adjust an audio volume, to adjust a cabin temperature, etc.

The vehicle computer 110 is programmed to determine an identifier of the first set of display content. The identifier identifies the vehicle system represented by the first set of display content. The identifier may be a string of, e.g., bits, alphanumeric characters, etc. The identifier of the first set of display content may match an identifier of the vehicle system represented by the first set of display content. As one example, upon displaying the first set of display content, the HMI 118 can provide the identifier to the vehicle computer 110, e.g., via the vehicle communication network. As another example, the HMI 118 can provide a message specifying the vehicle system represented by the first set of display content to the vehicle computer 110, e.g., via the vehicle communication network. In this situation, the vehicle computer 110 can determine the identifier based on the specified vehicle system. For example, the vehicle computer 110 can access a look-up table, or the like, e.g., stored in a memory of the vehicle computer 110, that associates identifiers with various vehicle systems.

Upon determining the identifier of the first set of display content, the vehicle computer 110 can input the identifier to a statistical model that outputs a plurality of probabilities that a user input will select each of a plurality of second display contents for display after the first set of display content is displayed. That is, the plurality of probabilities indicate a likelihood of transitioning from the first set of display content to each of the plurality of second display contents.

The statistical model is a stochastic model. For example, the statistical model may use a discrete-time Markov chain in which the probability of selecting each of the second set of display contents depends only on the first set of display content. In such an example, the statistical model can determine the probability of selecting a respective second display content based on a number of user inputs selecting the respective second display content after the first set of display content is displayed compared to a number of user inputs selecting each of the plurality of second display contents after the first set of display content is displayed. For example, a probability that a user input will select a respective second display content for display after the first set of display content is displayed can be determined based on Equation 1:

$$P(Content_i \mid Content_j) = \frac{N_s}{N_t} \quad (1)$$

where i is an identifier of the respective second display content and j is the identifier of the first set of display content, $N_s$ is a number of user inputs that have selected the respective second display content after the first set of display content is displayed and $N_t$ is a total number of user inputs that have selected each of the plurality of second display contents after the first set of display content is displayed. The statistical model may use one or more discrete-time Markov chains. For example, the statistical model may use one discrete-time Markov chain to determine the probability of selecting each of the second set of display contents based on a user and/or another discrete-time Markov chain to determine the probability of selecting each of the second set of display contents based on environment conditions and/or a number of occupants.

The vehicle computer 110 can maintain, e.g., stored in a memory of the vehicle computer 110, a plurality of counters for each of the plurality of second display contents given the first set of display content. Upon receiving a user input selecting a respective second display content after the first content is displayed, the vehicle computer 110 can increment the respective counter. Each counter represents the number $N_s$ of user inputs that have selected the respective second display content after the first set of display content is displayed. The vehicle computer 110 can then sum the plurality of counters to determine the total number $N_t$ of user inputs that have selected each of the plurality of second display contents after the first set of display content is displayed.

The statistical model can then generate a Markov matrix that represents the plurality of probabilities that a user input will select each of a plurality of second display contents for display after each of a plurality of first display contents are displayed. Said differently, the Markov matrix represents probabilities of transitioning from each of a plurality of first display contents to each of the plurality of second display contents. An example Markov matrix generated using a discrete-time Markov chain is shown in Table 1 below, in which the columns are associated with first display contents and the rows are associated with second display contents:

TABLE 1

| | Content$_1$ | Content$_2$ | Content$_3$ |
|---|---|---|---|
| Content$_1$ | 0 | P(Content$_1$ \| Content$_2$) | P(Content$_1$ \| Content$_3$) |
| Content$_2$ | P(Content$_2$ \| Content$_1$) | 0 | P(Content$_2$ \| Content$_3$) |
| Content$_3$ | P(Content$_3$ \| Content$_1$) | P(Content$_3$ \| Content$_2$) | 0 |

Additionally, or alternatively, the statistical model may use a continuous-time Markov chain in which a probability of selecting a second set of display content depends on the first set of display content and an amount of time that the first set of display content is displayed. For example, a probability that a user input will select a second set of display content for display within a specified time period after the first set of display content is displayed can be determined based on the Poisson distribution:

$$P_t(Content_i | Content_j) = \lambda e^{-\lambda} \quad (2)$$

where $\lambda$ is an average number of times that the respective second display content is selected in the specified time period. By using a continuous-time Markov chain, the statistical model can determine updated probabilities that a user input will select each of a plurality of second set of display contents for display as the amount of time that the first set of display content is displayed increases.

Upon displaying the first set of display content, the vehicle computer 110 can initiate a timer that indicates an amount of time that the first set of display content is displayed. Upon receiving a user input selecting a respective second display content after the first set of display content is displayed, the vehicle computer 110 can increment the respective counter, as discussed above. Additionally, the vehicle computer 110 can determine the amount of time indicated by the timer when the respective counter is incremented. The vehicle computer 110 can then include the amount of time in a look-up table, or the like, e.g., stored in a memory of the vehicle computer 110, that associates the amount of time to various second display contents selected after the first set of display content is displayed. The vehicle computer can determine $\lambda$ for a specified time period by summing the number of user inputs selecting the respective second display content within the specified time period after the first set of display content is displayed and dividing by the number of user inputs selecting the respective second display content after the first set of display content is displayed.

The statistical model can then generate a plurality of Markov matrices that represents the plurality of probabilities that a user input will select each of a plurality of second display contents for display after each of a plurality of first display contents are displayed within each of a plurality of specified time periods. Each of the plurality of time periods can be specified by a vehicle 105 and/or component 125 manufacturer and stored, e.g., in a memory of the vehicle computer 110. An example Markov matrix generated by using a continuous-time Markov chain for one specified time period is shown in Table 2 below, in which the columns are associated with first display contents and the rows are associated with second display contents:

TABLE 2

|  | $Content_1$ | $Content_2$ | $Content_3$ |
|---|---|---|---|
| $Content_1$ | 0 | $P_t(Content_1 | Content_2)$ | $P_t(Content_1 | Content_3)$ |
| $Content_2$ | $P_t(Content_2 | Content_1)$ | 0 | $P_t(Content_2 | Content_3)$ |
| $Content_3$ | $P_t(Content_3 | Content_1)$ | $P_t(Content_3 | Content_2)$ | 0 |

In an example in which the statistical model uses the discrete-time Markov chain and the continuous-time Markov chain, a total probability that a user input will select a second set of display content for display after the first set of display content is displayed can be determined by combining (e.g., by averaging and/or using some other statistical measure) the probability that a user input will select a second set of display content for display after the first set of display content is displayed and the plurality of probabilities that a user input will select a second set of display content for display within each of the plurality of specified time periods after the first set of display content is displayed. For example, the total probabilities that a user input will select each of the plurality of second display contents for display after each of the plurality of first display contents is displayed can be determined by combining corresponding cells in Table 1 and Table 2 (see Table 3).

TABLE 3

|  | $Content_1$ | $Content_2$ | $Content_3$ |
|---|---|---|---|
| $Content_1$ | 0 | $\dfrac{(P_t(Content_1 | Content_2) + P(Content_1 | Content_2))}{2}$ | $\dfrac{(P_t(Content_1 | Content_3) + P(Content_1 | Content_3))}{2}$ |
| $Content_2$ | $\dfrac{(P_t(Content_2 | Content_1) + P(Content_2 | Content_1))}{2}$ | 0 | $\dfrac{(P_t(Content_2 | Content_3) + P(Content_2 | Content_3))}{2}$ |

TABLE 3-continued

| | Content$_1$ | Content$_2$ | Content$_3$ |
|---|---|---|---|
| Content$_3$ | $\dfrac{(P_t(Content_3 \mid Content_1) + P(Content_3 \mid Content_1))}{2}$ | $\dfrac{(P_t(Content_3 \mid Content_2) + P(Content_3 \mid Content_2))}{2}$ | 0 |

Additionally, the statistical model can be trained to receive environment conditions and/or a number of occupants in the vehicle 105. The statistical model can then output a plurality of probabilities that a user input will select each of a plurality of second display contents after the first set of display content is displayed given the environment condition and/or the number of passengers. That is, in addition to inputting the identifier of the first set of display content, the vehicle computer 110 can input environment conditions and/or a number of occupants to the statistical model. The vehicle computer 110 can determine the environment conditions and/or number of occupants based on sensor 115 data, as discussed above. The vehicle computer 110 can then, as is known, be programmed to encode and serialize, i.e., convert to a string of bits, data, such as data describing the environment conditions and/or number of occupants, so that the data can be input to the statistical model. The statistical model can then generate a plurality of Markov matrices that represents the plurality of probabilities that a user input will select each of a plurality of second display contents for display after each of a plurality of first display contents are displayed given the environment conditions and/or a number of occupants, e.g., in substantially the same manner as discussed above regarding any of Tables 1-3. Inputting environment conditions and/or a number of occupants to the statistical model allows the vehicle computer 110 to update the HMI 118 based additionally on environment conditions and/or a number of occupants, which advantageously should allow the vehicle computer 110 to prioritize computational resources for the environment conditions and/or a number of occupants.

The vehicle computer 110 can identify a first probability for a predicted display content in the plurality of second display contents that is a highest probability in the plurality of probabilities. For example, the vehicle computer 110 can access the Markov matrix generated by the statistical model, e.g., one of Tables 1-3, and select the highest probability in the column associated with the first set of display content.

Upon identifying the first probability, the vehicle computer 110 determines an accuracy of the statistical model. The vehicle computer 110 then compares the accuracy to a threshold. The threshold specifies a minimum accuracy above which the vehicle computer 110 can update the HMI 118 based on the statistical model. The threshold can be specified by a vehicle 105 and/or component 125 manufacturer, e.g., based on computational resources available to provide the plurality of probabilities to at least one of the optimization model and the neural network 300. The threshold can be stored, e.g., in a memory of the vehicle computer 110. If the accuracy of the statistical model is less than the threshold, then the vehicle computer 110 can provide the plurality of probabilities output by the statistical model, i.e., the Markov matrix, to at least one of an optimization model and a neural network 300, as discussed below. If the accuracy of the statistical model is greater than or equal to the threshold, then the vehicle computer 110 can select a set of display content in the plurality of second display contents based on the first probability. That is, the vehicle computer 110 can select the second set of display content associated with the first probability in the Markov matrix, e.g., one of Tables 1-3.

The vehicle computer 110 is programmed to determine the accuracy of the statistical model based on a number of selections of respective second display contents assigned a probability in the plurality of probabilities compared to a number of predictions of the respective second display contents assigned a probability in the plurality of probabilities. For example, the accuracy of the statistical model with respect to a second set of display content can be determined by Equation 3:

$$A_j = \frac{N_s}{N_p} \quad (3)$$

where $A_j$ is the accuracy of the statistical model for selecting a second set of display content after a first set of display content is displayed and $N_p$ is the number of predictions of the respective second display contents assigned a probability in the plurality of probabilities.

Upon receiving a user input selecting a respective second display content, the vehicle computer 110 can increment the respective counter that represents the number $N_s$ of user inputs that have selected the respective second display content after the first set of display content is displayed, as discussed above. The vehicle computer 110 can maintain, e.g., stored in a memory of the vehicle computer 110, a plurality of predictions counters for each of the plurality of second display contents given the first set of display content. Upon identifying the first probability, the vehicle computer 110 can increment the respective prediction counter associated with the second set of display content. Each prediction counter represents the number $N_p$ of times that the user input will select the respective second display content after the first set of display content is displayed, as predicted by the statistical model. In other words, the prediction counters represent the number of times that the statistical model identifies a first probability associated with respective second display contents. The vehicle computer 110 can then determine the accuracy of the statistical model by combining (e.g., by averaging and/or using some other statistical measure) a plurality of accuracies $A_j$ of the statistical model for selecting each of the plurality of second display contents after each of a plurality of first display contents is displayed.

As explained above, the vehicle computer 110 can input the plurality of probabilities, i.e., the Markov matrix, to at least one of the optimization model and the neural network 300 based on the accuracy of the statistical model being below the threshold. As one example, the vehicle computer 110 can input the plurality of probabilities, i.e., the Markov matrix, to at least one of the optimization model and the neural network 300. As another example, the vehicle computer 110 can provide the plurality of probabilities, i.e., the Markov matrix, to the remote server computer 140. For example, the vehicle computer 110 can transmit the plurality of probabilities to the remote server computer 140, e.g., via the network 135. The remote server computer 140 can then input the plurality of probabilities, i.e., the Markov matrix, to at least one of the optimization model and the neural network 300.

Upon determining that the accuracy of the statistical model is below the threshold, the vehicle computer 110 can determine a number of user inputs that selected each of the plurality of second display contents after each of a plurality of first display contents are displayed. For example, the vehicle computer 110 can maintain, e.g., stored in a memory of the vehicle computer 110, a plurality of counters for each of the plurality of second display contents that represents a number of selections of the respective second display content after each of a plurality of first display contents are displayed. The vehicle computer 110 can increment respective counters based on detecting a user input selecting a respective second display content after a respective first display content is displayed. The vehicle computer 110 can then sum the plurality of counters to determine the number of user inputs that have selected each of the plurality of second display contents after each of the plurality of first display content are displayed.

The vehicle computer 110 can then compare the number of user inputs that selected each of the plurality of second display contents after each of a plurality of first display contents are displayed to an input threshold. The input threshold specifies a minimum number of user inputs that select second display content above which the vehicle computer 110 can input the plurality of probabilities to the optimization model. The input threshold can be specified by a vehicle 105 and/or component 125 manufacturer, e.g., such that the number of user inputs provides a statistically significant sample size, and can be stored, e.g., in the memory of the vehicle computer 110. If the number of user inputs is above the input threshold, then the vehicle computer 110 can provide the plurality of probabilities to the optimization model that outputs a plurality of updated probabilities. The vehicle computer 110 can then provide the updated probabilities to the neural network 300 that outputs a second probability. If the number of user inputs is below the input threshold, then the vehicle computer 110 can provide the plurality of probabilities to the neural network 300 that outputs the second probability.

The optimization model can be trained to receive the plurality of probabilities, e.g., a Markov matrix, and to output a plurality of updated probabilities. That is, the optimization model can update each of the plurality of probabilities output by the statistical model. The optimization model can use Bayesian learning techniques to update the plurality of probabilities. For example, the optimization model can initialize the statistical model with aggregated data. Aggregated data means data from a plurality of vehicle computers that provide user inputs that select each of a plurality of second display contents after the first set of display content is displayed independently of one another and then combining (e.g., by averaging and/or using some other statistical measure) the results. That is, the vehicle computer 110 or the remote server computer 140 may be programmed to receive user inputs that select each of a plurality of second display contents after the first set of display content is displayed from a plurality of vehicle computers. The vehicle computer 110 or the remote server computer 140 can then input the aggregated data to the optimization model. The optimization model outputs the plurality of updated probabilities based on the aggregated data. For example, the optimization model can update the Markov matrix to include the updated probabilities.

In an example in which the remote server computer 140 inputs the plurality of probabilities to the optimization model, the remote server computer 140 can then provide the plurality of updated probabilities to the vehicle computer 110. For example, the remote server computer 140 can transmit the plurality of updated probabilities to the vehicle computer 110, e.g., via the network 135.

Upon receiving the plurality of updated probabilities from the optimization model, the vehicle computer 110 can, for example, identify an updated first probability for the predicted display content as the highest updated probability in the plurality of updated probabilities. The vehicle computer 110 can select the predicted display content based on the updated first probability. That is, the vehicle computer 110 can select the second set of display content associated with the updated first probability in the updated Markov matrix.

The vehicle computer 110 or the remote server computer 140 can input the plurality of probabilities (or the plurality of updated probabilities) to the neural network, such as a deep neural network (DNN) (see FIG. 3), that can be trained to accept the plurality of probabilities and generate an output of a second probability for the predicted display content. In an example in which the remote server computer 140 inputs the plurality of probabilities (or the plurality of updated probabilities) to the neural network, the remote server computer 140 can then provide the second probability to the vehicle computer 110. For example, the remote server computer 140 can transmit the second probability to the vehicle computer 110, e.g., via the network 135.

Upon receiving the second probability, the vehicle computer 110 can combine (e.g., by averaging and/or using some other statistical measure) the first (or updated first) probability and the second probability. The vehicle computer 110 can select the predicted display content based on the combined probability. For example, the vehicle computer 110 can compare the combined probability to a probability threshold. The probability threshold can be specified by a vehicle 105 and/or component 125 manufacturer and stored, e.g., in a memory of the vehicle computer 110. The combined probability specifies a probability below which the vehicle computer 110 does not select the second set of display content associated with the combined probability. If the combined probability is greater than or equal to the probability threshold, then the vehicle computer 110 selects the second set of display content associated with the combined probability. If the combined probability is less than the probability threshold, then the vehicle computer 110 selects a new probability from the plurality of probabilities output from the statistical model. For example, the vehicle computer 110 can select a next highest probability in the plurality of probabilities. The vehicle computer 110 can then provide the new probability to at least one of the optimization model that outputs a new updated probability or the neural network 300 that outputs a new second probability. The vehicle computer 110 can then select the predicted display content based on a new combined probability.

Figure 4:
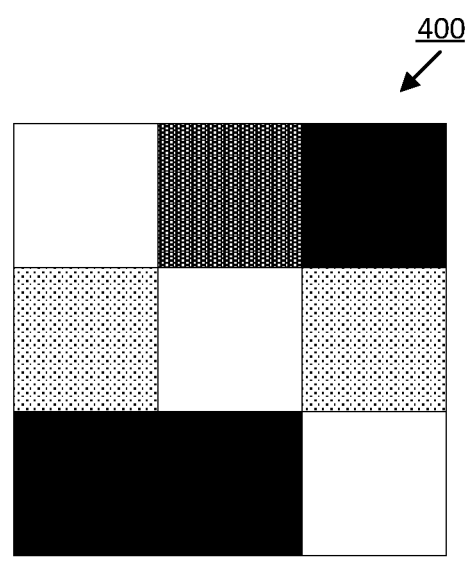
FIG. 4 is an example of a prediction image.

To input the plurality of probabilities to the neural network 300, the vehicle computer 110 (or the remote server computer 140) can generate a prediction image 400 based on the plurality of probabilities (or the plurality of updated probabilities), as shown in FIG. 4. The prediction image 400 includes a plurality of pixels (or groups of pixels) that correspond to each of a plurality of cells in the Markov matrix. Each pixel (or group of pixels) includes an indicia, e.g., a color, that represents the probability (or updated probability) of the corresponding cell. In examples in which the statistical model uses a plurality of Markov chains, the vehicle computer 110 (or the remote server computer 140) can generate a plurality of prediction images 400 corresponding to each of the Markov chains. The vehicle computer 110 (or the remote server computer 140) can input the prediction image(s) 400 to the neural network 300.

The vehicle computer 110 can update the HMI 118 based on the selected display content. As set forth above, if the accuracy of the statistical model is greater than or equal to the threshold, then the vehicle computer 110 can select a second set of display content based on the first probability. If the accuracy of the statistical model is less than the threshold, then the vehicle computer 110 can select a second set of display content based on the first (or updated first) probability and the second probability.

To update the HMI 118, the vehicle computer 110 can actuate the HMI 118 to display the selected display content based on a user input confirming a prediction. For example, the HMI 118 may be programmed to provide a message specifying the prediction to transition to the selected display content. Additionally, the HMI 118 can provide a virtual button or the like, which is non-selectable prior to the vehicle computer 110 providing the prediction, that is selectable via the touchscreen display to confirm the prediction. In other words, the HMI 118 may activate sensors 115 that can detect the user touching the virtual button to transition to the selected display content. Upon detecting the user input via the virtual button, the HMI 118 can transition the touchscreen display from the first set of display content to the selected display content.

Additionally, or alternatively, the vehicle computer 110 can actuate the HMI 118 to adjust positions of one or more virtual buttons 200-1, 200-2, 200-3, 200-4 based on the selected display content. For example, the HMI 118 may be programmed to display the virtual buttons 200-1, 200-2, 200-3, 200-4 corresponding to each of the plurality of second display contents on the touchscreen display (see FIG. 2A). Typically, the HMI 118 displays virtual buttons 200-1, 200-2, 200-3, 200-4 that are specified by a vehicle 105 and/or component 125 manufacturer. Additionally, the specified virtual buttons 200-1, 200-2, 200-3, 200-4 (collectively, virtual buttons 200) are displayed in specified positions on the HMI 118, e.g., specified by an HMI 118 coordinate system having an origin on the HMI 118.

Based on the selected display content, the HMI 118 can update a position of the virtual button associated with the selected display content and can update positions of the other virtual buttons accordingly. In an example in which the virtual button 200-4 associated with the selected display content is one of the specified virtual buttons 200-1, 200-2, 200-3, 200-4, the HMI 118 can move the virtual button 200-4 associated with the selected display content from a trailing position that is farthest from a driver, e.g., adjacent a rightmost side of a touchscreen display, to a leading position that is closest to the driver, e.g., adjacent a leftmost side of the touchscreen display (see FIG. 2B). In this situation, the HMI 118 then moves the virtual buttons 200-1, 200-2, 200-3 towards the trailing position, i.e., away from the driver.

In an example in which a virtual button 200-5 associated with the selected display content is not one of the specified virtual buttons 200-1, 200-2, 200-3, 200-4, the HMI 118 can remove one of the specified virtual buttons 200-3, e.g., the virtual button corresponding to the second set of display content associated with a lowest probability of the plurality of probabilities, and replace it with the virtual button 200-5 associated with the selected display content (see FIG. 2C). The HMI 118 can update the virtual button 200-5 associated with the selected display content, e.g., to prevent a user from having to scroll through the plurality of virtual buttons 200 prior to the virtual button 200-5 associated with the selected display content being displayed and/or having to make one or more selections prior to the virtual button 200-5 associated with the selected display content being made selectable by the HMI 118. That is, the HMI 118 can update a hierarchy of the virtual buttons 200 such that the virtual buttons 200 that are associated with higher probabilities of being selected are moved higher in the hierarchy than virtual buttons that are associated with lower probabilities of being selected.

Additionally, or alternatively, the vehicle computer 110 can actuate the HMI 118 to transition the second set of display content to an activated state based on the selected display content. For example, the HMI 118 can transition the selected display content to the activated state prior to transitioning other second display contents to the activated state. The HMI 118 can then transition subsequent second display contents to the activated state based on corresponding probabilities of each second display contents. In the activated state, the HMI 118 can detect user inputs activating the vehicle system represented by the second set of display content, and can provide the user input to the vehicle computer 110. The vehicle computer 110 can then actuate one or more vehicle components 125 based on the user input. Activating the second set of display contents based on their corresponding probabilities can reduce the likelihood that a user will select a second set of display content prior to the second set of display content being activated. Further, activating the second set of display contents based on their corresponding probabilities allows the vehicle computer 110 to prioritize computational resources by sequentially activating the second set of display contents.

Additionally, the HMI 118 can transition second display contents to a deactivated state, or prevent the second set of display contents from transitioning to the activated state, based on the statistical model. For example, the HMI 118 can deactivate one or more second display contents based on a corresponding probability of the plurality of probabilities being below a predetermined threshold. The predetermined threshold can be specified by a vehicle 105 and/or component 125 manufacturer, and stored, e.g., in a memory of the vehicle computer 110. As another example, the HMI 118 can deactivate the second set of display content associated with the lowest probability of the plurality of probabilities. Deactivating second display contents allows the vehicle computer 110 to avoid using computational resources to activate display contents that are unlikely to be selected, which can reduce an amount of time for the vehicle computer 110 to activate display content that are likely to be selected.

Additionally, or alternatively, the vehicle computer 110 can actuate the HMI 118 to display a preferred display content upon transitioning the vehicle 105 to the ON state, i.e., as the first set of display content. The vehicle computer 110 can determine the preferred display content based on the statistical model. For example, the vehicle computer 110 can obtain the Markov matrix, e.g., any one of Tables 1-3, output by the statistical model. The vehicle computer 110 can then determine a plurality of preference probabilities for each of the plurality of sets of display content via matrix multiplication. That is, the vehicle computer 110 can multiply the Markov matrix by itself to obtain a preference matrix that represents the plurality of preference probabilities. The plurality of preference probabilities correspond to each of the plurality of display contents, and are unconditional probabilities representing a likelihood of the corresponding display content being displayed. The vehicle computer 110 can multiple the preference matrix by the Markov matrix any number of subsequent times. The vehicle computer 110 can then identify a probability of the preferred display content as the highest probability in the preference matrix. Upon identifying the preferred display content, the vehicle computer 110 can actuate the HMI 118 to set the preferred display content as the first set of display content. In other words, the vehicle computer 110 can actuate the HMI 118 to display the preferred display content upon transitioning the vehicle 105 to the ON state. As another example, the vehicle computer 110 can actuate the HMI 118 to display the preferred display content upon transitioning the vehicle 105 to a low power state, in which power is provided to a predetermined subset, i.e., some but less than all, of vehicle components 125.

Figure 3:
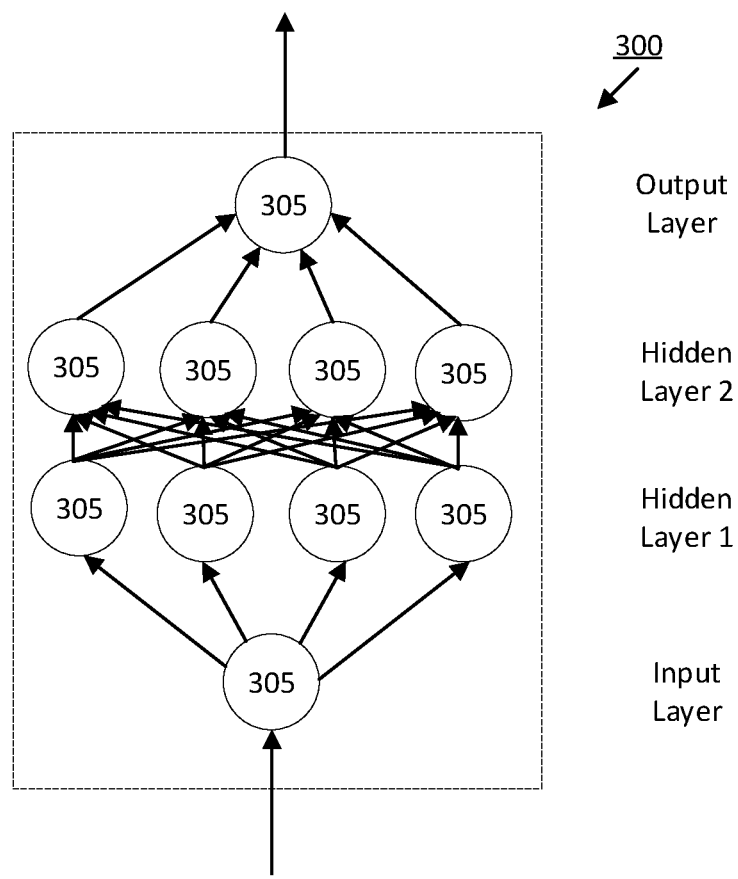
FIG. 3 is an example of a deep neural network.

FIG. 3 is a diagram of an example deep neural network (DNN) 300 that can be trained to determine a second probability for a predicted display content based on the plurality of probabilities. The DNN 300 can be a software program that can be loaded in memory and executed by a processor included in a computer, for example. In an example implementation, the DNN 300 can include, but is not limited to, a convolutional neural network (CNN), R-CNN (Region-based CNN), Fast R-CNN, and Faster R-CNN. The DNN includes multiple nodes, and the nodes are arranged so that the DNN 300 includes an input layer, one or more hidden layers, and an output layer. Each layer of the DNN 300 can include a plurality of nodes 305. While FIG. 4 illustrate three hidden layers, it is understood that the DNN 300 can include additional or fewer hidden layers. The input and output layers may also include more than one node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to an activation function, which in turn provides a connected neuron 305 an output. The activation function can be a variety of suitable functions, typically selected based on empirical analysis. As illustrated by the arrows in FIG. 4, neuron 305 outputs can then be provided for inclusion in a set of inputs to one or more neurons 305 in a next layer.

As one example, the DNN 300 can be trained with ground truth data, i.e., data about a real-world condition or state. For example, the DNN 300 can be trained with ground truth data and/or updated with additional data by a processor of the remote server computer 140. Weights can be initialized by using a Gaussian distribution, for example, and a bias for each node 305 can be set to zero. Training the DNN 300 can include updating weights and biases via suitable techniques such as back-propagation with optimizations. Ground truth data used for training can include, but is not limited to, data specifying user inputs that select a plurality of second display contents after each of a plurality of first display content are displayed, environment conditions, and a number of occupants in the vehicle 105.

The vehicle computer 110 obtains a plurality of probabilities as output from a statistical model. Additionally, the vehicle computer 110 obtains sensor 115 data of the environment around the vehicle 105 and of the passenger cabin of the vehicle 105. The vehicle computer 110 can provide the plurality of probabilities (and the sensor 115 data) to the DNN 300. The DNN 300 generates an output based on the received input. The output is a second probability for the predicted display content.

Figure 5:
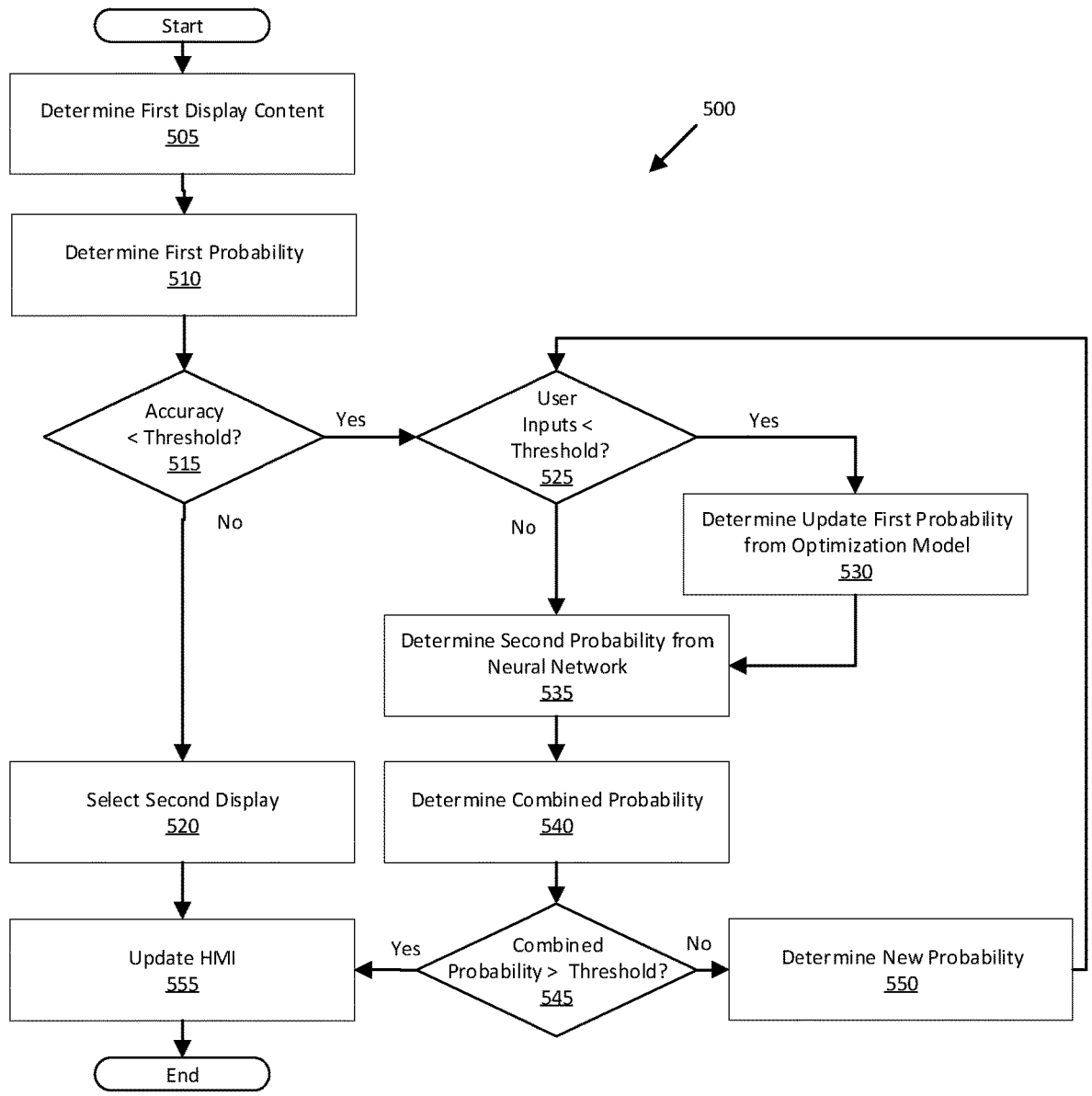
FIG. 5 is a flowchart of an example process for updating the vehicle display.

FIG. 5 is a diagram of an example process 500 for updating an HMI 118. The process 500 begins in a block 505. The process 500 can be carried out by a vehicle computer 110 included in a vehicle 105 executing program instructions stored in a memory thereof.

In the block 505, the vehicle computer 110 determines an identifier of a first set of display content. As discussed above, the HMI 118 can display any one of a plurality of sets of display content as the first set of display content. As one example, the first set of display content can be a last display content that was displayed when the vehicle 105 was previously in the ON state, as discussed above. As another example, the first set of display content can be a preferred display content. As discussed above, first display content refers to the display content that is currently displayed on the HMI 118, e.g., upon transitioning the vehicle 105 to an on state, and second display content refers to display content that is displayed after the first set of display content.

As one example, upon displaying the first set of display content, the HMI 118 can provide the identifier to the vehicle computer 110, e.g., via the vehicle communication network. As another example, the HMI 118 can provide a message specifying the vehicle system represented by the first set of display content to the vehicle computer 110, e.g., via the vehicle communication network. In this situation, the vehicle computer 110 can determine the identifier based on the specified vehicle system, as discussed above. The process 500 continues in a block 510.

In the block 510, the vehicle computer 110 determines a first probability for a predicted display content in the plurality of second display contents. The vehicle computer 110 inputs the identifier of the first set of display content to a statistical model that outputs a plurality of probabilities that a user input will select each of a plurality of second display contents after the first set of display content is displayed, as discussed above. For example, the statistical model can use a discrete-time Markov chain and/or a continuous-time Markov chain to generate a Markov matrix of the plurality of probabilities that a user input will select each of the plurality of second display contents after each of a plurality of first display contents are displayed, as discussed above. The vehicle computer 110 can then determine the first probability is a highest probability in the plurality of probabilities. For example, the vehicle computer 110 can access the Markov matrix generated by the statistical model, e.g., one of Tables 1-3, and select the highest probability in the column associated with the first set of display content, as discussed above. The process 500 continues in a block 515.

In the block 515, the vehicle computer 110 determines whether an accuracy of the statistical model is less than a threshold. The vehicle computer 110 is programmed to determine the accuracy of the statistical model based on a number of selections $N_s$ of respective second display contents assigned a probability in the plurality of probabilities compared to a number of predictions $N_p$ of the respective second display contents assigned a probability in the plurality of probabilities, as discussed above. For example, the vehicle computer 110 can determine an accuracy $A_j$ of the statistical model for selecting a second set of display content after a first set of display content is displayed according to Equation 3 above. The vehicle computer 110 can then determine the accuracy of the statistical model by combining (e.g., by averaging and/or using some other statistical measure) a plurality of accuracies of the statistical model for selecting each of the plurality of second display contents after each of a plurality of first display contents is displayed. If the accuracy of the statistical model is less than the threshold, then the process 500 continues in a block 525. Otherwise, the process 500 continues in a block 520.

In the block 520, the vehicle computer 110 selects a second set of display content based on the first probability. For example, the vehicle computer 110 can access the Markov matrix and select the second display associated with the first probability, i.e., the highest probability, in the plurality of probabilities. The process 500 continues in a block 555.

In the block 525, the vehicle computer 110 determines whether a number of user inputs that selected each of the plurality of second display contents after each of a plurality of first display contents are displayed is below an input threshold. The vehicle computer 110 can determine the number of user inputs that selected each of the plurality of second display contents after each of a plurality of first display contents are displayed based on a plurality of counters for each of the plurality of second display contents that represents a number of selections of the respective second display content after each of a plurality of first display contents are displayed, as discussed above. The vehicle computer 110 can then compare the number of user inputs that selected each of the plurality of second display contents after each of a plurality of first display contents are displayed to the input threshold. If the number of user inputs is below the input threshold, then the process 500 continues in a block 530. Otherwise, the process 500 continues in a block 535.

In the block 530, the vehicle computer 110 determines an updated first probability from an optimization model. For example, the vehicle computer 110 can input the plurality of probabilities to the optimization model. The optimization model can be trained to initialize the statistical model with aggregated data and output a plurality of updated probabilities, as discussed above. The optimization model can then update the Markov matrix to include the updated probabilities. The vehicle computer 110 can identify an updated first probability for the predicted display content as the highest updated probability in the plurality of updated probabilities, as discussed above.

Alternatively, the vehicle computer 110 can provide the plurality of probabilities to a remote server computer 140. For example, the vehicle computer 110 can transmit the plurality of probabilities to the remote server computer 140, e.g., via the network 135. The remote server computer 140 can then input the plurality of probabilities to the optimization model and provide the plurality of updated probabilities to the vehicle computer 110. For example, the remote server computer 140 can transmit the plurality of updated probabilities to the vehicle computer 110, e.g., via the network 135. The process 500 continues in the block 535.

In the block 535, the vehicle computer 110 determines a second probability for the predicted display content in the plurality of second display contents from a neural network 300. The vehicle computer 110 (or the remote server computer 140) can input the plurality of probabilities (or the plurality of updated probabilities) to the neural network 300. For example, the vehicle computer 110 (or the remote server computer 140) can generate a prediction image 400 based on the Markov matrix, as discussed above. The neural network 300 generates the second probability for the predicted display content based on the plurality of probabilities (or the plurality of updated probabilities), e.g., the prediction image 400. The process 500 continues in a block 540.

In the block 540, the vehicle computer 110 determines a combined probability the predicted display content. For example, the vehicle computer 110 can combine (e.g., by averaging and/or using some other statistical measure) the first (or updated first) probability and the second probability. The process 500 continues in a block 545.

In the block 545, the vehicle computer 110 determines whether the combined probability is less than a probability threshold. The vehicle computer 110 compares the combined probability to the probability threshold. If the combined probability is less than the probability threshold, then the process 500 continues in a block 550. If the combined probability is greater than or equal to the probability threshold, then the vehicle computer 110 selects the second set of display content associated with the first and second probabilities, and the process 500 continues in the block 555.

In the block 550, the vehicle computer 110 selects a new probability for the predicted display content from the plurality of probabilities. For example, the vehicle computer 110 can select a next highest probability in the plurality of probabilities output from the statistical model. The process 500 returns to the block 525.

In the block 555, the vehicle computer 110 updates the HMI 118 based on the selected second display. As one example, the vehicle computer 110 can actuate the HMI 118 display the selected display content based on a user input confirming a prediction, as discussed above. Additionally, or alternatively, the vehicle computer 110 can actuate the HMI 118 to adjust positions of one or more virtual buttons 200 based on the selected display content, as discussed above. Additionally, or alternatively, the vehicle computer 110 can actuate the HMI 118 to transition the second set of display contents to an activated state based on the selected display content. For example, the HMI 118 can transition the selected display content to the activated state prior to transitioning other second display contents to then activated state, as discussed above.

Additionally, or alternatively, the vehicle computer 110 can actuate the HMI 118 to transition second display contents to a deactivated state, or prevent the second set of display contents from transitioning to the activated state, based on the statistical model, as discussed above. For example, the HMI 118 can deactivate one or more second display contents based on a corresponding probability of the plurality of probabilities being below a predetermined threshold. As another example, the HMI 118 can deactivate the second set of display content associated with the lowest probability of the plurality of probabilities. The process 500 ends following the block 555.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   determine an identifier for a first set of display content on a vehicle display;
   input the identifier to a statistical model that outputs a plurality of probabilities that a user input will select each of a plurality of second set of display contents for display after the first set of display content is displayed;
   identify a first probability for a predicted set of display content in the plurality of second set of display contents that is a highest probability in the plurality of probabilities;
   provide the plurality of probabilities to at least one of an optimization model and a neural network upon determining an accuracy of the statistical model is below a threshold, wherein the accuracy is determined based on a number of selections of respective second set of display contents assigned a probability in the plurality of probabilities compared to a number of predictions of the respective second set of display contents assigned a probability in the plurality of probabilities;

upon receiving, from the at least one of the optimization model and the neural network, a second probability that the user input will select the predicted set of display content in the plurality of second set of display contents, select the predicted set of display content based on the first probability and the second probability; and update the vehicle display based on the selected set of display content.

2. The system of claim 1, further comprising a remote computer including a second processor and a second memory storing instructions executable by the second processor to input the plurality of probabilities to the neural network that outputs the second probability.

3. The system of claim 2, wherein the instructions further include instructions to, upon generating a prediction image that corresponds to the plurality of probabilities, input the prediction image to the neural network, wherein pixels of the prediction image have indicia that represent each of the plurality of probabilities.

4. The system of claim 1, further comprising a remote computer including a second processor and a second memory storing instructions executable by the second processor to:

input the plurality of probabilities to the optimization model that outputs a plurality of updated probabilities, wherein the optimization model updates the plurality of probabilities based on aggregated data; and update the first probability for the predicted set of display content in the plurality of second set of display contents to be a highest updated probability in the plurality of updated probabilities.

5. The system of claim 4, wherein the instructions further include instructions to input the plurality of updated probabilities to the neural network that outputs the second probability that the user input will select the predicted set of display content in the plurality of second set of display contents.

6. The system of claim 5, wherein the instructions further include instructions to, upon generating a prediction image that corresponds to the plurality of probabilities, input the prediction image to the neural network, wherein pixels of the prediction image have indicia that represent each of the plurality of probabilities.

7. The system of claim 5, wherein the instructions further include instructions to, upon receiving the second probability that the user input will select the selected set of display content in the plurality of second set of display contents, select the predicted set of display content based on the updated first probability and the second probability.

8. The system of claim 4, wherein the instructions further include instructions to input the plurality of probabilities to the optimization model based on a number of user inputs selecting each of the plurality of second set of display contents after the first set of display content is displayed being above a threshold.

9. The system of claim 1, wherein the statistical model determines the plurality of probabilities based on a number of respective user inputs selecting the respective second set of display content after the first set of display content is displayed compared to a number of user inputs selecting second set of display contents after the first set of display content is displayed.

10. The system of claim 9, wherein the statistical model determines the plurality of probabilities based additionally on an amount of time the first set of display content is displayed.

11. The system of claim 1, wherein the instructions further include instructions to, upon determining the accuracy of the statistical model is greater than or equal to the threshold, select the predicted set of display content based on the first probability.

12. The system of claim 1, wherein the instructions further include instructions to disable a second set of display content that is associated with a lowest probability for a predicted set of display content in the plurality of second set of display contents.

13. The system of claim 1, wherein the instructions further include instructions to update positions of virtual buttons on the vehicle display based on the selected set of display content, wherein the virtual buttons represent respective second set of display contents.

14. The system of claim 1, wherein the statistical model outputs a plurality of probabilities that a user input will select each of a plurality of second set of display contents after the first set of display content is displayed based on at least one of environment conditions and a number of occupants in a vehicle.

15. The system of claim 1, wherein the instructions further include instructions to:

determine a preferred display content based on the statistical model; and upon detecting the vehicle display transitioning to an ON state, display the preferred display content.

16. A method, comprising:

determining an identifier for a first set of display content on a vehicle display;

inputting the identifier to a statistical model that outputs a plurality of probabilities that a user input will select each of a plurality of second set of display contents for display after the first set of display content is displayed;

identifying a first probability for a predicted set of display content in the plurality of second set of display contents that is a highest probability in the plurality of probabilities;

providing the plurality of probabilities to at least one of an optimization model and a neural network upon determining an accuracy of the statistical model is below a threshold, wherein the accuracy is determined based on a number of selections of respective second set of display contents assigned a probability in the plurality of probabilities compared to a number of predictions of the respective second set of display contents assigned a probability in the plurality of probabilities;

upon receiving, from the at least one of the optimization model and the neural network, a second probability that the user input will select the predicted set of display content in the plurality of second set of display contents, selecting the predicted set of display content based on the first probability and the second probability; and updating the vehicle display based on the selected set of display content.

17. The method of claim 16, further comprising:

based on a number of user inputs selecting each of the plurality of second set of display contents after the first set of display content is displayed being above a threshold, inputting the plurality of probabilities to the optimization model that outputs a plurality of updated probabilities, wherein the optimization model updates the plurality of probabilities based on aggregated data; and updating the first probability for the predicted set of display content in the plurality of second set of display contents to be a highest updated probability in the plurality of updated probabilities.

18. The method of claim 17, further comprising inputting the plurality of updated probabilities to the neural network that outputs the second probability that the user input will select the predicted set of display content in the plurality of second set of display contents.

19. The method of claim 18, further comprising, upon receiving the second probability that the user input will select the selected set of display content in the plurality of second set of display contents, selecting the predicted set of display content based on the updated first probability and the second probability.

20. The method of claim 16, further comprising, upon determining the accuracy of the statistical model is greater than or equal to the threshold, selecting the predicted set of display content based on the first probability.

* * * * *

UNITED STATES PATENT AND TRADEMARK OFFICE
CERTIFICATE OF CORRECTION

PATENT NO. : 11,977,715 B2
APPLICATION NO. : 17/171273
DATED : May 7, 2024
INVENTOR(S) : Fling Finn Tseng Page 1 of 1

It is certified that error appears in the above-identified patent and that said Letters Patent is hereby corrected as shown below:

On the Title Page

Item (57), On Line 1 insert --a-- after "for"

Signed and Sealed this
Fourth Day of June, 2024

Katherine Kelly Vidal
*Director of the United States Patent and Trademark Office*